(12) United States Patent
Spafford et al.

(10) Patent No.: US 7,827,728 B1
(45) Date of Patent: Nov. 9, 2010

(54) ANIMAL DECOY APPARATUS

(76) Inventors: Ronald A. Spafford, 3218 Glenbarr Dr., Janesville, WI (US) 53548; Mel G. Stankewicz, 1440 Marquette St., Janesville, WI (US) 53546

( * ) Notice: Subject to any disclaimer, the term of this patent is extended or adjusted under 35 U.S.C. 154(b) by 0 days.

(21) Appl. No.: 12/618,811

(22) Filed: Nov. 16, 2009

(51) Int. Cl.
*A01M 31/06* (2006.01)
(52) U.S. Cl. ............................................. 43/2; 273/403
(58) Field of Classification Search ....................... 43/2; D22/125; 446/226, 331; 273/403
See application file for complete search history.

(56) References Cited

U.S. PATENT DOCUMENTS

| | | | | |
|---|---|---|---|---|
| 4,821,444 A | * | 4/1989 | Remus | 43/2 |
| 5,791,081 A | * | 8/1998 | Turner et al. | 43/2 |
| 5,943,807 A | * | 8/1999 | McPherson | 43/2 |
| 6,021,594 A | * | 2/2000 | Krueger | 43/2 |
| 6,254,100 B1 | * | 7/2001 | Rinehart | 273/403 |
| 6,349,902 B1 | * | 2/2002 | Cripe | 244/153 R |
| 6,550,773 B2 | * | 4/2003 | McKenzie et al. | 273/403 |
| 6,901,693 B1 | * | 6/2005 | Crowe | 43/2 |
| 7,086,193 B1 | * | 8/2006 | Hurst | 43/2 |
| 7,739,826 B1 | * | 6/2010 | Druliner | 43/3 |

* cited by examiner

*Primary Examiner*—Christopher P Ellis
(74) *Attorney, Agent, or Firm*—Donald J. Ersler

(57) ABSTRACT

The invention provides animal decoys and animal decoy kits comprising a body portion and a support member. The support member is made up of a sleeve with a top end and a bottom end, wherein the top end of the support member is positioned within the body portion of the decoy. The decoy can also include a carrying aperture, having an interior surface, and a reinforcement member positioned to cover at least a portion of the interior surface of the carrying aperture. The body portion of the decoy can further contain textural ridges and a carrying strap, which passes through the carrying aperture.

13 Claims, 7 Drawing Sheets

ANIMAL DECOY APPARATUS

CROSS-REFERENCE TO RELATED APPLICATIONS

This application claims the benefit of U.S. Provisional Application No. 60/635,726, filed Dec. 10, 2004, U.S. Provisional Application No. 60/633,622, filed Dec. 6, 2004, U.S. Nonprovisional application Ser. No. 11/294,043, filed on Dec. 5, 2005 and U.S. Nonprovisional application Ser. No. 11/755,053, filed on May 30, 2007, which are hereby incorporated by reference.

BACKGROUND OF THE INVENTION

Numerous animal decoys have been created to attract other wild animals such as deer, turkey, waterfowls, and the like. While many of these decoys have been improved to more realistically reflect a live animal, the designs of these decoys are often too cumbersome for the user to conveniently store and/or transport. In addition, many of the presently available decoys contain a burdensome number of pieces, which can impede upon the user's ability to easily carry a plurality of decoys to the desired site.

SUMMARY OF THE INVENTION

The present invention provides an animal decoy that allows for the user to more easily store, transport, and/or carry the decoy to the destination site. The design of the decoy provides for very few pieces, adding to the convenience of storing, transporting, or assembling a plurality of decoys, without sacrificing the decoy's visual appearance.

In one embodiment, the invention provides an animal decoy including a body portion and a support member. The support comprises a sleeve, having a top end and a bottom end, wherein the top end is positioned within the body portion of the animal decoy.

In another embodiment, the body portion of the animal decoy further includes a carrying aperture and a reinforcement member. The carrying aperture has an interior surface, and the reinforcement member may optionally be positioned to cover at least a portion of the interior surface of the carrying aperture.

In another embodiment, the animal decoy further comprises a cap and a support rod. The cap is positioned on the top end of the sleeve. The top end of the sleeve, including the cap, is embedded or positioned within the body portion of the animal decoy. The support rod can be positioned within or received by the bottom end of the sleeve.

In yet another embodiment, the body portion of the animal decoy contains textural ridges.

In another embodiment, the invention provides an animal decoy kit including an animal decoy, a support rod, and a carrying strap. The animal decoy comprises a body portion and a support member. The support member comprises a sleeve, having a top end and a bottom end, wherein the top end of the sleeve can be positioned within the body portion of the decoy. The body portion of the animal decoy can further comprise a carrying aperture and a reinforcement member. The carrying aperture has an interior surface, and the reinforcement member can be positioned to cover at least a portion of the interior surface of the carrying aperture. The animal decoy can further comprise a cap. The cap can be positioned on the top end of the sleeve, and the top end of the sleeve, including the cap, can be positioned within of received by the bottom end of the sleeve. The carrying strap can be fed or passes through the carrying aperture.

In another embodiment, the invention provides a deer decoy including a body portion comprised of a substantially flat and substantially rigid sheet of material having an outline resembling that of a deer. The body portion has a head section, a front section, a mid section, and an end section, wherein each section has a first vertical edge and a second vertical edge. The mid section has a mid-section support member comprising a mid-section sleeve having a top end and a bottom end, wherein the top end of the mid-section sleeve is embedded or positioned within the mid section. The deer decoy further comprises at least one attachment member which runs horizontally through and extends a distance beyond the first and second vertical edges of the mid section. The attachment member couples the second vertical edge of the front section to the first vertical edge of the mid section and the first vertical edge of the end section to the second vertical edge of the mid section.

The deer decoy further comprises a head-section support member comprising a head-section sleeve having a top end and a bottom end, wherein the top end of the head-section sleeve is embedded or positioned within the second vertical edge of the head section and the bottom end of the head-section sleeve is embedded within the first vertical edge of the front section. Optionally, the deer decoy can further comprise a pin having a top end and a bottom end, wherein the bottom end of the pin is embedded in the first vertical edge of the front section, and the top end of the pin is received by the bottom end of the head-section sleeve.

In another embodiment, the deer decoy can further comprise a mid-section cap and a support end. The mid-section cap is positioned on the top end of the mid-section sleeve. The top end of the mid-section sleeve, including the mid-section cap, is embedded or positioned within the mid section of the deer decoy. The support rod can be positioned within or received by the bottom end of the mid-section sleeve.

In another embodiment, the invention provides a bird decoy comprising a body portion, having an outline resembling that of a bird, an aperture, and a receiving cap. The body portion is comprised of a top section and a bottom section, wherein the top section is comprised of a substantially sturdy material and the bottom section is comprised of a substantially flexible material. The aperture passes through the entire bottom section and a substantial amount of the top section of the body portion. The receiving cap is located within the top section of the body portion and substantially in line with the aperture.

Other aspects of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "positioned," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION OF THE INVENTION

The present invention relates to various configurations for animal decoys.

Figure 1:
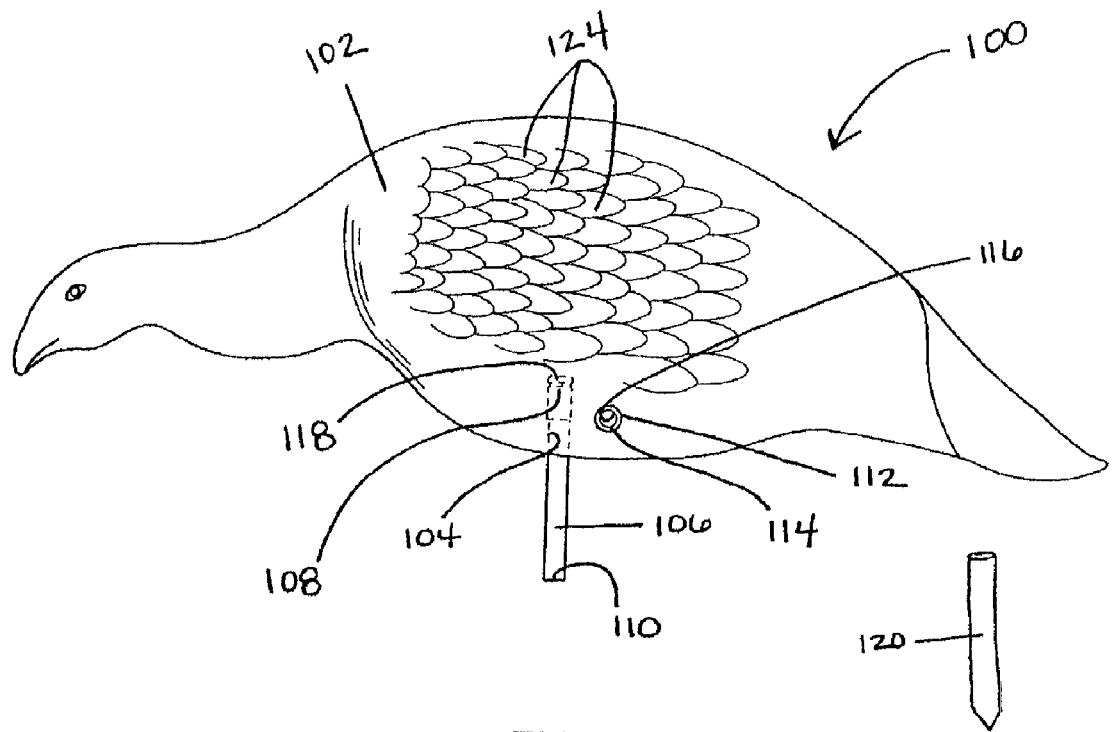
FIG. 1 is a side view of a turkey decoy.
Figure 1A:
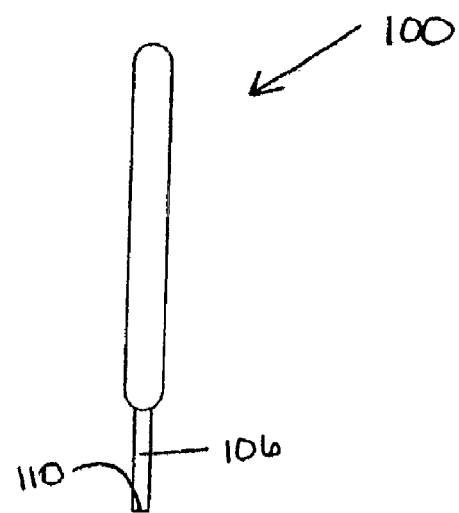
FIG. 1A is a front view of a turkey decoy.
Figure 2:
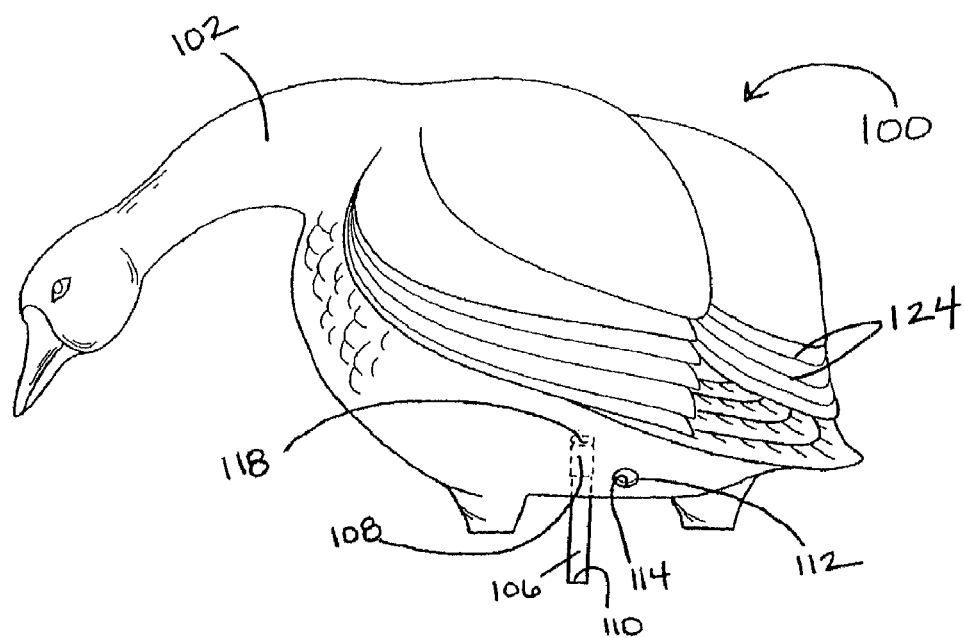
FIG. 2 is a side view of a goose decoy.
Figure 3:
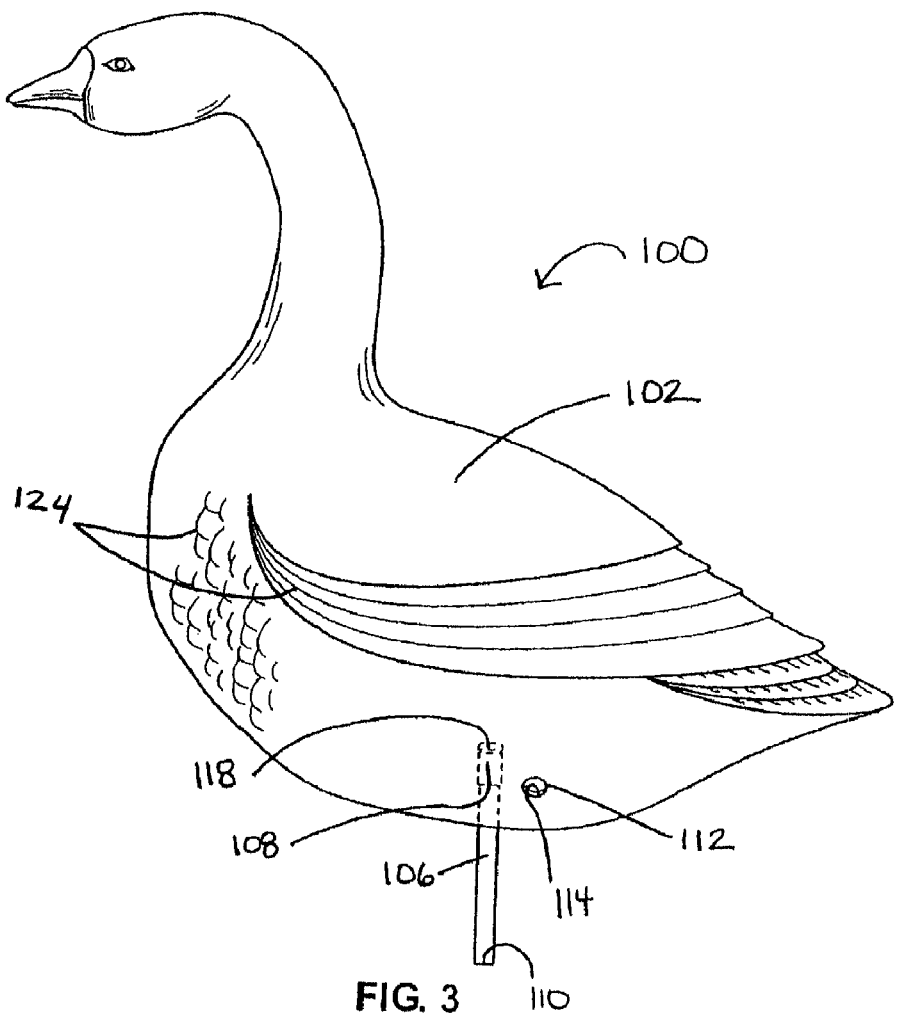
FIG. 3 is a side view of a goose decoy.
Figure 9:
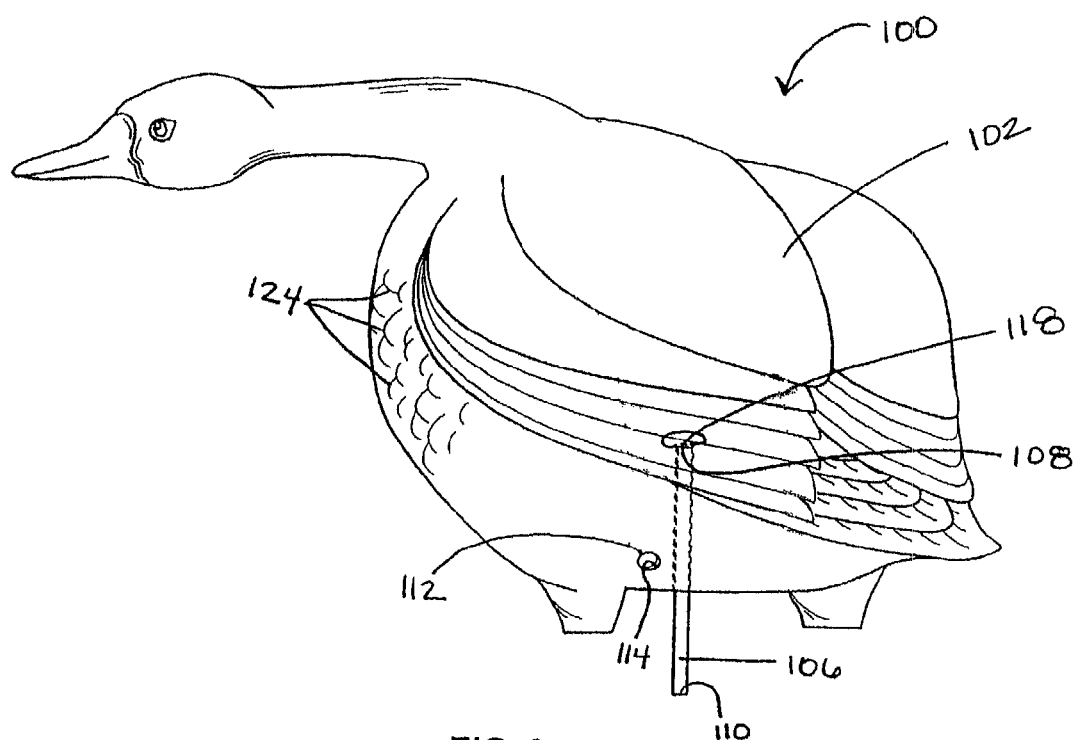
FIG. 9 is a side view of a bird decoy.

FIG. 1 illustrates an exemplary animal decoy 100. The animal decoy 100 includes a body portion 102 and a support member 104. The body portion 102 is comprised of a substantially thin and substantially rigid sheet of material having an outline or silhouette resembling that of an animal. The outline of silhouette of the body portion 102 may resemble any of a number of animals including, but not limited to, a goose, as exemplified in FIGS. 2 and 3; a deer, as exemplified is FIG. 4; a turkey, as exemplified in FIGS. 1, 1A, 5, and 6; a bird, as exemplified in FIG. 9; or hens, bears, foxes, etc.

The body portion 102 of the animal decoy 100 may be comprised of any lightweight material. Suitably, the body portion 102 is comprised of a high-density material. Exemplary materials include, but are not limited to, foams, such as EPS foam or polyurethane, cork, Styrofoam, foam rubber, or any other material that is known in the art. In one embodiment, the body portion 102 comprises high-density foam, such as polyurethane foam. Polyurethane foam is useful due to its ability to withstand substantial wear and tear, and thus, be more durable and longer lasting than many of the other types of suitable materials. Further, polyurethane foam allows the animal decoy 100 to be assembled in harsh weather conditions, without sacrificing the integrity and/or effectiveness of the animal decoy 100.

The body portion 102 may be constructed, molded, or otherwise formed in any manner known in the art. An exemplary method of constructing the body portion 102 is by way of molding process. Suitable molding methods include, but are not limited to, injection molding and/or open-poured molding. Numerous methods other than molding, such as sculpting or cutting, may also be used and are envisioned to be within the scope of the invention.

The advantageous characteristics of the shape of the body portion 102, and the weight of the material utilized, allows for the for the body portions 102 to be easily stacked, stored, and/or transported in an efficient manner without sacrificing the strength or effectiveness of the animal decoy 100. For example, the thinness of the body portion 102 allows for a plurality of animal decoys 100 to be stacked either during transportation of storage without consuming a lot of storage space. The thin, lightweight design of the body portion 102 results in a break-resistant animal decoy 100 that is capable of being positioned on ice and/or inserted into frozen ground. Further, the animal decoy's 100 minimal number of parts enhances the user's ability to more easily carry numerous animal decoys 100 to and from a remote destination site in a relatively unburdensome and quiet manner.

As shown in FIG. 1, the animal decoy 100 further comprises a support member 10. The support member 104 comprises a sleeve 106 having a top end 108 and a bottom end 110, wherein the top end 108 of the sleeve 106 is positioned or embedded in the body portion 102 of the animal decoy 100. The support member 104 can comprise any number of materials, including, but not limited to, plastic or metal. One suitable material includes plastic. The dimensions of the sleeve 106 can resemble any number of shapes, including, but not limited to, a circle or a square. In one embodiment, the sleeve 106 is created from polyvinyl chloride (i.e., "pvc") tubing.

The animal decoy 100 can further contain a carrying aperture 112 positioned anywhere on the body portion 102 of the animal decoy 100. The carrying aperture 112 has an interior surface 114 and can be any number of shapes or sizes. Suitably, the carrying aperture 112 is large enough to allow for a thin rope to pass through the carrying aperture 112. The carrying aperture 112 enhances a user's ability to store, carry, and/or transport a plurality of body portions 102 and from remote destinations. For example, a plurality of body portions 102 may be bound together by a rope or other means to greater simplify storage and/or transportation of the body portions 102. The carrying aperture 112 can also be used to tie one or more body portions 102 down to another surface to substantially prevent the body portions 102 from shifting during transportation and/or storage.

The animal decoy 100 can further comprise a reinforcement member 116 covering at least a portion of the interior surface 114 or the carrying aperture 112. The reinforcement member 116 can be comprised of any number of materials, including, but not limited to, plastic or metal. In one embodiment, the reinforcement member 116 is comprised of metal. The reinforcement member 116 substantially protects the interior surface 114 of the carrying aperture 112 from wear and tear that may be caused by transporting and/or storing the body portions 102 of the animal decoy 100.

Optionally, the animal decoy 100 can further comprise of a cap 118 and a support rod 120. The cap 118 is positioned on the top end 108 of the sleeve 106. The top end 108 of the sleeve 106, including the cap 118, is then embedded or positioned within the body portion 102 of the animal decoy 100. The support rod 120 is placed in the ground of a holding device, while the other end of the support rod 120 is received by the bottom end 110 of the sleeve 106. The support rod 120 is capable of supporting the body portion 102 of the animal decoy 100 and allows for the body portion 102 to move in a horizontal plane relative to an underlayment.

The cap 118 and support rod 120 can comprise of any a number of materials, including, but not limited to, wood, plastic, or metal. Suitably, the cap 118 and the support rod 120 are comprised of metal. When both the cap 118 and the support rod 120 are comprised of metal, the metal cap/metal support rod interaction creates a metal-to-metal contact, which greatly reduces the friction between the support rod and the boy portion 102 generally. The support rod 120 and the cap 118 are designed in such a way as to allow the body portion 102 of the animal decoy 100 to move easily when hit by elements of nature, ranging from light breezes to strong winds, without allowing the animal decoy 100 to tip over. Some embodiments provide for the support rod 120 to be constructed in such a way as to allow the user to more easily insert one end of the support rod 120 into hard and/or frozen ground. In some embodiments, the support rod 120 is formed to reduce the possibility that the user will be poked and/or injured by the ends of the support rod 120 during transportation of the animal decoy 100.

As shown in FIGS. 1,2,3,6, and 9, the surface of the body portion 102 can further contain textural ridges 124. Among other advantages, the textural ridges 124 help reduce or even eliminate what can be described as a "flat-surface" glare. The creation of flat surfaces can often result in a shiny or reflective exterior, which can impede upon the effectiveness of the animal decoy 100. The textural ridges 124 can also be added in such a way as to more strongly reflect a live animal. The textural ridges 124 include other advantageous functions as well, including, but not limited to, providing friction between two body portions 102 and/or body portions 102 and another surface, which may reduce the ability of a stack of body portions 102 from shifting during storage or transportation and muffle some of the noise that may be produced by the interaction of two body portions 102 when a user carries a plurality of body portions 102 to and from a destination.

The textural ridges 124 can be created through a number of methods, including, but not limited to, carving, sculpting, molding, or even attaching pieces of material to the body portion 102. One suitable way to create a non-glare surface on the body portion 102 is to apply materials to the surface on the body portion 102, with the use of adhesives, to create texture and/or offset light. Another suitable way to create a non-glare surface is through the application of non-glare paint. Yet another suitable technique that can be used to create textural ridges 124 is through the use of a sculpted mold. A sculpted mold can be used to create textural ridges 124 on the body portion 102 to resemble a "feather-texture" which, among other things, provides the dual advantage of reducing surface glare and mimicking the resemblance of a live animal. Optionally, the mold can further contain a cavity in the body portion 102 to provide a location for insertion of the support member 104.

The invention can further comprise a carrying strap 126. The carrying strap 126 is capable of passing through the carrying aperture 112 and/or reinforcement member 116. A user can feed the carrying strap 126 through the carrying aperture 112 and/or reinforcement member 116 when it is desired that the carrying strap 126 be employed, or remove the carrying strap 126 from the animal decoy 100 before the animal decoy 100 is to be assembled. The carrying strap 126 allows the user to carry multiple animal decoys 100 simultaneously to and from the destination site without negatively impacting the user's comfort and without allowing the animal decoy's parts to get entangled. For example, the design and strength of the carrying mechanism, i.e., the carrying aperture 112, the reinforcement member 116, and the carrying strap 126, allows users to carry a plurality of animal decoys 100 without using their hands and/or arms freeing up the users to carry other equipment or supplies. The carrying strap 126 can also be used to tie a plurality of body portions 102 together, which allows users to throw the carrying strap 126 over their shoulder for easier transport or hang the body portions 102 during storage.

The invention also provides for animal decoy kits. The animal decoy kits include an animal decoy 100, a support rod 120, and a carrying strap 126. The animal decoy 100 comprises a body portion 102 and a support member 104. The support member 104 comprises a sleeve 106, having a top end 108 and a bottom end 110, wherein the top end 108 is embedded within the body portion 102 of the animal decoy 100. The animal decoy 100 can further comprise a cap 118 positioned on the top end 108 of the sleeve 106. The top end 108 of the sleeve 106, including the cap 118, can be positioned within the body portion 102 of the animal decoy 100. The animal decoy 100 can further comprise a carrying aperture 112 and a reinforcement member 116. The carrying aperture 112 has an interior surface 114 and is positioned anywhere on the body portion 102. The reinforcement member 116 can be positioned to cover at least a portion of the interior surface 114 of the carrying aperture 112. The support rod 120 of the animal decoy kit can be positioned within the support member 104 of the animal decoy 100, and the carrying strap 126 can pass or be fed through the carrying aperture 112.

Figure 4:
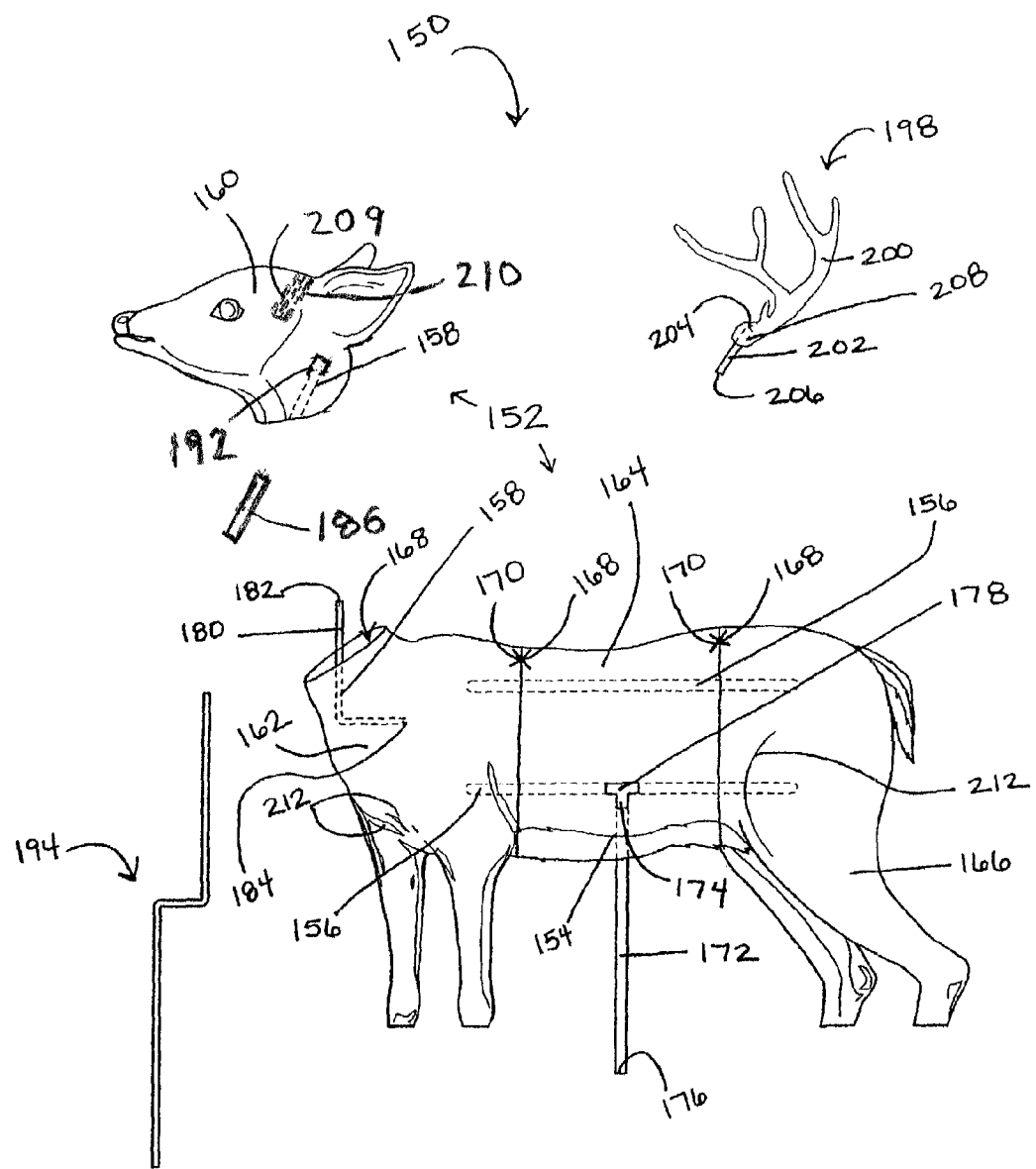
FIG. 4 is a side view of a deer decoy.
Figure 5:
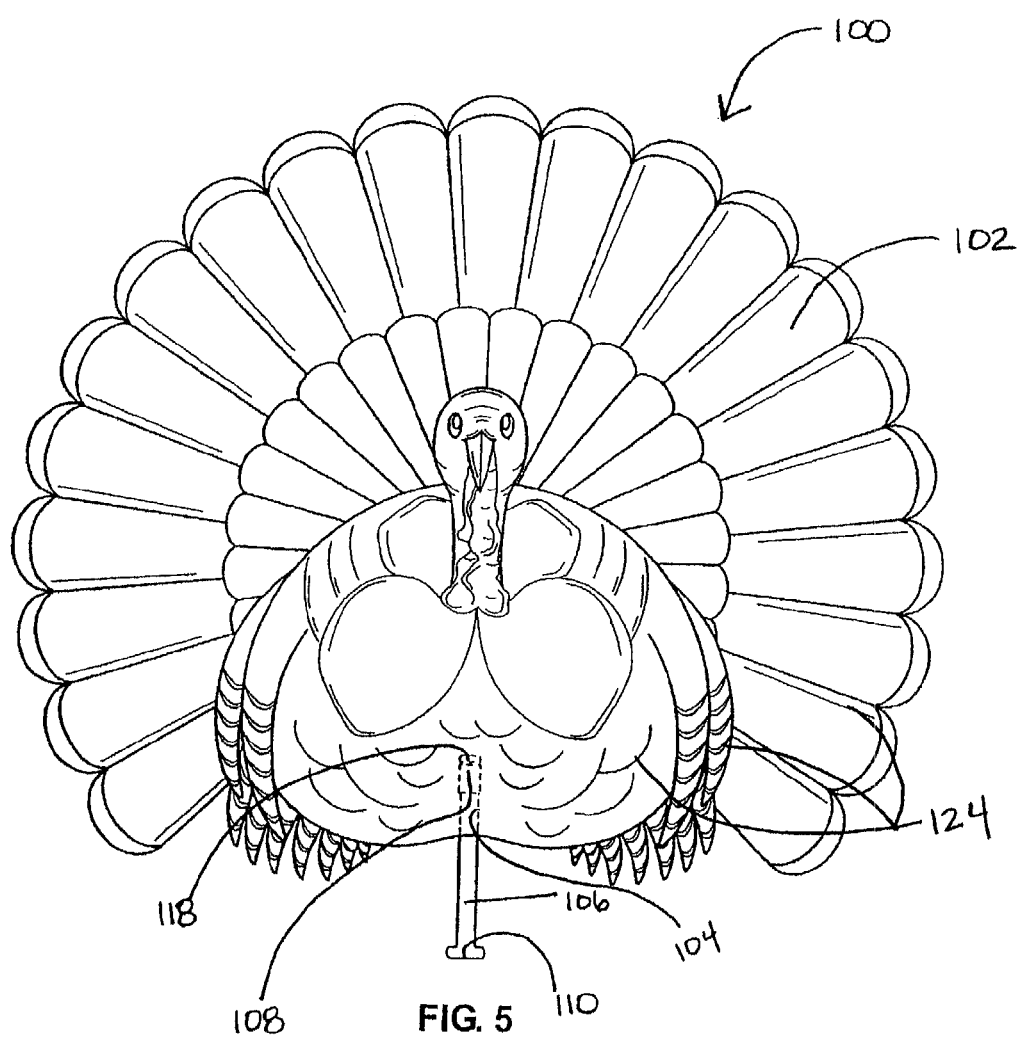
FIG. 5 is a front view of a turkey decoy.
Figure 6:
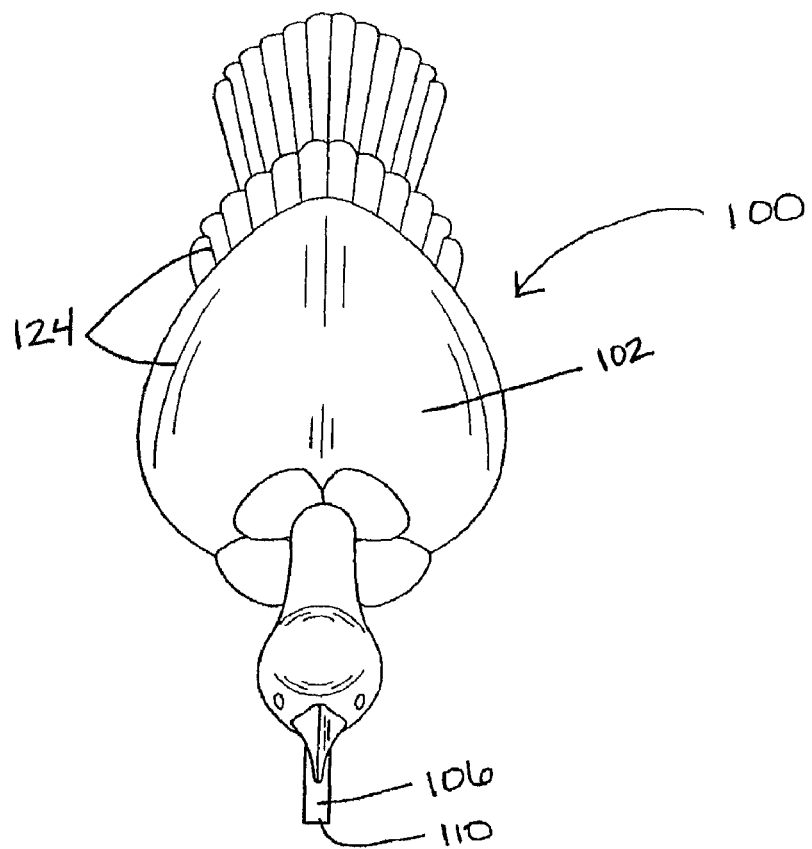
FIG. 6 is a top view of a turkey decoy.

In another embodiment, the invention provides a deer decoy 150. FIG. 4 illustrates an exemplary deer decoy 150. The deer decoy 150 includes a body portion 152, a mid-section support member 154 and at least one attachment member 156. The body portion 152 has an outline or silhouette resembling that of a deer and includes a head section 160, a front section 162, a mid section 164, and an end section 166, wherein each section has a first vertical edge 168 and a second vertical edge 170. The body portion 152 of the deer decoy 150 shares the advantageous characteristics of the body portion 102 of the animal decoys 100 described above, including the body portion 152 of the deer decoy 150 that can be easily stacked, stored, and/or transported in an easy and efficient manner without sacrificing the strength or effectiveness or the decoy. In addition, the design of the body portion 152 results in a break-resistant decoy that is capable of being positioned on ice and/or inserted into frozen ground.

Like the animal decoy 100 described above, the body portion 152 of the deer decoy 150 is comprised of a substantially flat and substantially rigid sheet of material can be comprised of any lightweight material, and more suitably, any high density material. In one embodiment, the body portion 152 is comprised of high-density foam, such as polyurethane foam. The deer decoy is intended to include the following species: deer, elk, antelope, caribou, moose and any other appropriate animal. As with the animal decoy 100 above, the body portion 152 may be constructed, molded, or otherwise formed in any manner known in the art. An exemplary method of constructing the body portion 152 is by way of a molding process, such as injection molding and/or open-poured molding. In addition, numerous methods other than molding, such as sculpting or cutting, may also be used and are envisioned to be within the scope of the invention.

The mid-section support member 154 of the deer decoy 150 comprises a mid-section sleeve 172, having a top end 174 and a bottom end 176, wherein the top end 174 of the mid-section sleeve 172 is embedded or positioned within the mid section 164 of the body portion 152. The mid-section sleeve 172 may be comprised of any number of materials, including, but not limited to, metal, plastic, or wood. In one embodiment, the mid-section sleeve 172 includes a mid-section cap 178 retained on the top end 174 of the mid-section sleeve 172, which can be then positioned within the mid section 164 of the body portion 152.

As exemplified in FIG. 4, the attachment member 156 of the deer decoy 150 runs horizontally through and extends a distance beyond the first vertical edge 168 and the second vertical edge 170 of the mid section 164. The attachment member 156 couples the second vertical edge 170 of the front section 162 to the first vertical edge 168 of the mid section 164 and the first vertical edge 168 of the end section 166 to the second vertical edge 170 of the mid section 164. The attachment member 156 may be comprised of any number of materials, including, but not limited to, metal, plastic, or wood. In one embodiment, the attachment member 156 comprises pvc pipe. The mid-section cap 178 includes an inner perimeter that is sized to receive the attachment member 156. The attachment member 156 is preferably inserted through the mid-section cap 178.

A head bore 158 is formed in the head section 160. A head-section cap 192 is preferably pressed or inserted into an end of the head bore 158. A head-section sleeve 186 is preferably pressed or inserted into the head bore 158. The head-section sleeve 186 includes an inner diameter that is sized to rotatably receive a front-section tube 180. However, the front-section tube 180 could also be a solid rod and characterized as a projection. Further, the head bore 158 could be sized to rotatably receive the front-section tube 180, which would eliminate the head-section sleeve 186. The front-section tube 180 includes a top end 182 and a bottom end 184. The top end 182 of the front-section tube 180 is rotatably received by the head-section sleeve 186, such that the head section 160 rotates or pivots relative to the front section 162. The bottom end 184 of the head-section tube 180 can be embedded in the front section 162 of the body portion 152. The materials used to construct the head-section tube 180 are similar to those used for the sleeve 106 provided in the animal decoy 100 description above. In one embodiment, the front-section tube 180 and the head-section sleeve 186 are fabricated from pvc pipe. However, the front-section tube 180 and head section sleeve 186 may be fabricated from any suitable material, such as metal.

The deer decoy 150 can further include a support rod 194, which is received by the bottom end 176 of the mid-section 172, which can be positioned on the top end 174 of the mid-section sleeve 172. The support rod 194 allows for the body portion 152 to rotate in a horizontal plane above the ground or water. The support rod 194 and mid-section cap 178 can comprise any number of materials, including, but not limited to, plastic, wood, or metal. As discussed above, when both the support rod is comprised of metal, the metal cap/metal support rod interaction creates metal-to-metal contact, which greatly reduces the friction between the support rod 194 and the mid-section sleeve 172 generally.

The deer decoy 150 may further comprise an antler member 198, as shown in FIG. 4. The antler member 198 comprises an antler piece 200 and an antler-attachment member 202, having a top end 204 and a bottom end 206. The top end 204 of the antler-attachment member 202 is embedded in the antler piece 200 and the bottom end 206 of the antler-attachment member 202 is embedded and positioned within the head section 160 of the body portion 152. Optionally, the deer decoy 150 can further include an antler support bore 209 with an antler sleeve 210 inserted therein. The antler sleeve 210 is embedded or positioned within the head section 160 and is capable of receiving the bottom end 206 of the antler-attachment member 198.

As with the animal decoys 100 above, the surface of the body portion 152 of the deer decoy 150 can further contain textural ridges 212, which can reduce/or even eliminate what can be described as a "flat-surface" glare. The textural ridges 212 provide many other advantages, which are discussed in the description of the animal decoy 100 above. The methods in which textured ridges can be added to the body portion 152 are also similar to those discussed above, including, but not limited to, carving, sculpting, molding, or even attaching pieces of material to the body portion 152.

In yet another embodiment, a collapsible bird decoy 220 provided. As exemplified in FIGS. 7 and 8, the bird decoy 220 includes a body portion 222 and a receiving cap 224. The body portion 222 is shaped to resemble a three dimensional bird and is comprised of materials that allow for the body portion 222 to be substantially flat when unassembled and substantially three dimensional when assembled. In addition to providing a three-dimensional decoy, the flexibility and low weight of the materials used allows for the body portion 222 to be easily transported and/or stored, taking up less space, without sacrificing the quality of the decoy.

Figure 7:
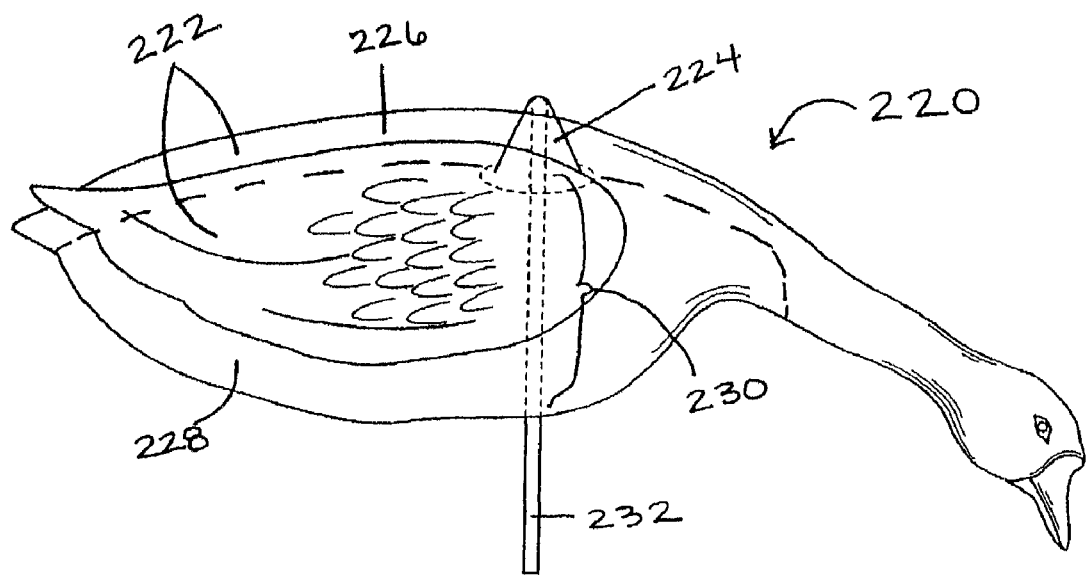
FIG. 7 is a side perspective view of a collapsible bird decoy.
Figure 8:
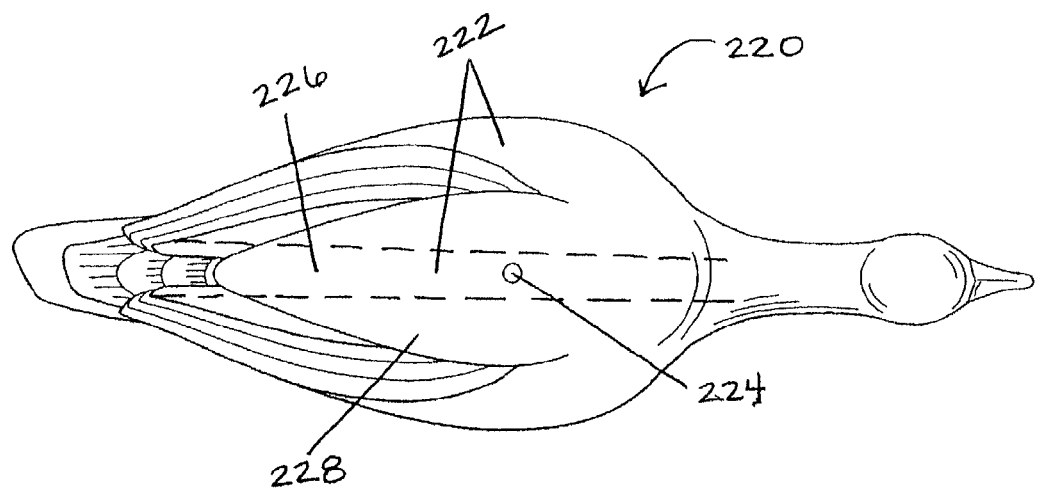
FIG. 8 is a top view of a collapsible bird decoy.

As shown in FIG. 7, the body portion 222 of the bird decoy 220 is comprised of a top section 226, a bottom section 228, and an aperture 230. The top section 226 and the bottom section 228 of the body portion 222 can be comprised of any number of materials. Suitably, the top section 226 is comprised of a sturdier material than the bottom section 228, such that the material of the top section 226 aids in maintaining the shape of a silhouette of a bird. The bottom section 228 is suitably comprised of at least two layers of material, which allows for the body portion 222 to provide a three dimensional body portion 222 when assembled. For example, in one embodiment, the top section 226 is comprised of foam while the bottom section 228 is comprised of two pieces of fabric, which allows the body portion 222 to sag and hollow out when assembled. Further, the bottom section 228 can be weighted to allow for gravity to force, or more easily allow, the body portion 222 to hollow out when assembled.

The aperture 230 of the body portion 222 passes through the entire bottom section 228 and a substantial part of the top section 226 of the body portion 222. The receiving cap 224 of the bird decoy 220 is located within the top section 226 of the body portion 222 and substantially in line with the aperture 230. The aperture 230 allows for the body portion 222 to receive a support rod 232, and the receiving cap 224 provides reinforcement for the strain that is placed on the top section 226 of the body portion 222 by the support rod 232. When the body portion 222 is mounted on the support rod 232 via the aperture 230 and the receiving cap 224, gravity forces the body portion 222 to sag or hollow out, thus allowing the decoy to resemble a three dimensional bird. The receiving cap 224 and the support rod 232 can be comprised of any number of materials. Suitably, the receiving cap 224 and support rod 232 are comprised of metal resulting in a metal-on-metal interaction, which provides many of the advantages discussed herein above.

The invention also provides for a support base 250 for mounting the various decoys. Two embodiments of the support base are provided in FIG. 10. Unlike many of the presently available animal decoys 100, which can often be used on only one of land or water, the decoy of the present invention is easily adaptable to allow the user to display the decoy on both land and water. The support base 250 comprises at least one board 252 and at least one mounting aperture 254. The mounting aperture 254 is positioned on the board 252 and provides a location for the support rod 120 to be inserted. The board 252 can comprise any number of materials, including, but not limited to, metal, wood, or a buoyant material. In one embodiment, the boards 252 are comprised of a buoyant material.

Figure 10:
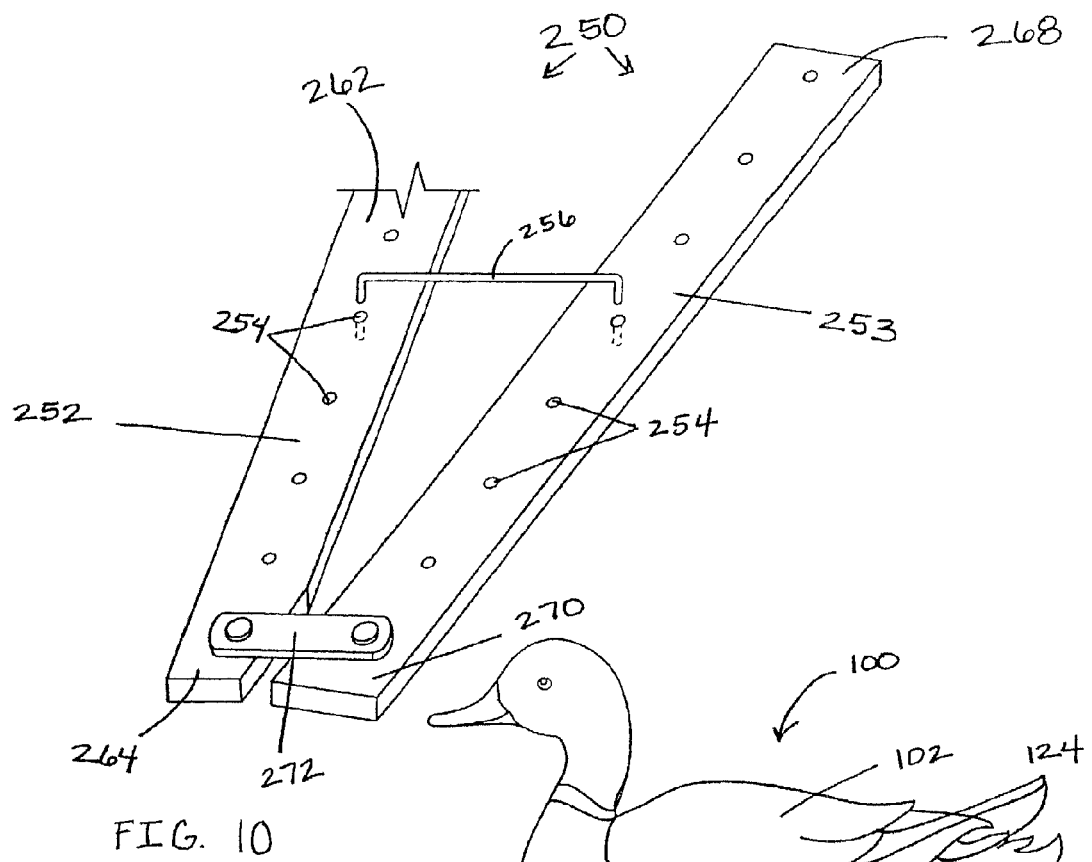
FIG. 10 is a top perspective view of a support base for the various decoys.
Figure 10A:
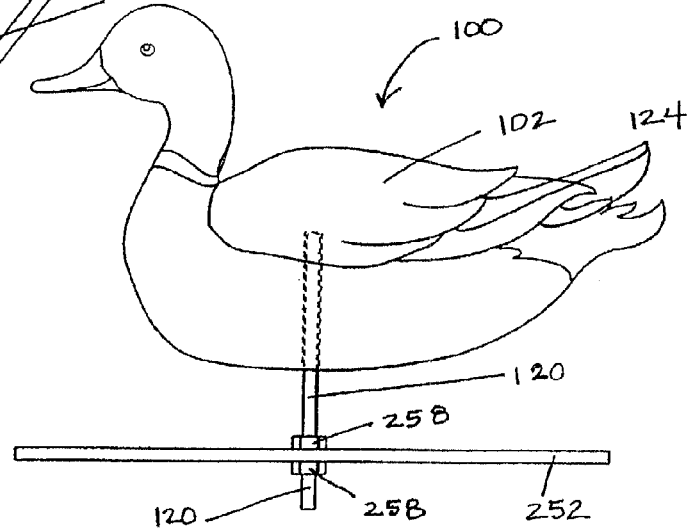
FIG. 10A is an elevation view showing an animal decoy positioned on a support base.

As exemplified in FIG. 10, one embodiment of the support base 250 comprises a first board 252 and a second board 253, at least one mounting aperture 254, a spreader wire 256, and at least one spring clip 258. In this embodiment, the first board 252, having a free end 262 and a pivot end 264, and the second board 253, having a free end 268 and a pivot end 270, are coupled at their respective pivot ends. The free ends of the first and second boards can then pivot about the pivot ends of the first and second boards to create support for the support rod 120 and the body portion 102 of the decoy. The first board 252 and the second board 253 can be coupled together by any means known in the art. In one embodiment, the pivot ends of the boards are coupled using a pivot bracket 272. The spreader wire 256 is made of any suitable material known in the art and holds the first and second boards apart at a set distance and strengthens the stability of the support base 250. The spring clips 258 are comprised of any suitable clip and can be used in conjunction with the support rod 120 to adjust the height of the decoy above support base 250.

It is to be appreciated that the decoy of the present invention has been described in particular detail with respect to preferred processes and structures. The preferred method is ideally suited for the described decoy. The present invention, however, is not intended to be limited to these preferred embodiments. One skilled in the art will readily recognize that the actual method may be adjusted to accommodate particular method conditions. Various features and advantages of the invention are set forth in the following claims.

The invention claimed is:

1. A deer decoy, comprising:
a body portion comprised of a substantially flat and substantially rigid sheet of material having an outline resembling that of a deer, said body portion including a head section, a front section, a mid-section, and a rear section, said front section, said mid-section and said rear section are each separate pieces;
at least two lengthwise pins coupling said front section, said mid-section and said rear section together;
a support sleeve being retained in said mid-section, a top of said support sleeve being terminated with a cap, one of said at least two lengthwise pins is inserted through said cap; and
said head section resembling a head of a deer, said head section including a head bore for rotatably receiving a projection extending from an end of said front section.

2. The deer decoy of claim 1, further comprising:
an antler member being inserted into a top of said head section.

3. The deer decoy of claim 1, further comprising:
a head-section sleeve being inserted into said head bore for receiving said projection.

4. The deer decoy of claim 1 wherein:
said projection being inserted into said front section.

5. The deer decoy of claim 1, further comprising:
an end cap being inserted into said head bore.

6. A deer decoy, comprising:
a body portion comprised of a substantially flat and substantially rigid sheet of material having an outline resembling that of a deer, said body portion including a head section, a front section, a mid-section, and a rear section, said front section, said mid-section and said rear section are each separate pieces;
at least two lengthwise pins coupling said front section, said mid-section and said rear section together;
a support sleeve being retained in said mid-section, a top of said support sleeve being terminated with a cap, one of said at least two lengthwise pins is inserted through said cap; and
said head section resembling a head of a deer, said head section including a head bore, a head-section sleeve being pressed into said head bore, said head section sleeve including an inner diameter for rotatably receiving a projection extending from an end of said front section.

7. The deer decoy of claim 6, further comprising:
an antler member being inserted into a top of said head section.

8. The deer decoy of claim 6 wherein:
said projection being inserted into said front section.

9. The deer decoy of claim 1, further comprising:
an end cap being inserted into said head bore.

10. A deer decoy, comprising:
a body portion comprised of a substantially flat and substantially rigid sheet of material having an outline resembling that of a deer, said body portion including a head section, a front section, a mid-section, and a rear section, said front section, said mid-section and said rear section are each separate pieces;
at least two lengthwise pins coupling said front section, said mid-section and said rear section together;
a support sleeve being retained in said mid-section, a top of said support sleeve being terminated with a cap, one of said at least two lengthwise pins is inserted through said cap;
said head section resembling a head of a deer, said head section including a head bore for rotatably receiving a projection extending from an end of said front section; and
an antler member being retained in a top of said head section.

11. The deer decoy of claim 10, further comprising:
a head-section sleeve being inserted into said head bore for receiving said projection.

12. The deer decoy of claim 10 wherein:
said projection being inserted into said front section.

13. The deer decoy of claim 10, further comprising:
an end cap being inserted into said head bore.

* * * * *